United States Patent
Dusad

(10) Patent No.: US 11,463,336 B2
(45) Date of Patent: Oct. 4, 2022

(54) CONFERENCING SESSION MANAGEMENT

(71) Applicant: Avaya Management L.P., Durham, NC (US)

(72) Inventor: Manish Dusad, Galway (IE)

(73) Assignee: Avaya Management L.P., Durham, NC (US)

( * ) Notice: Subject to any disclaimer, the term of this patent is extended or adjusted under 35 U.S.C. 154(b) by 0 days.

(21) Appl. No.: 17/171,246

(22) Filed: Feb. 9, 2021

(65) Prior Publication Data
US 2022/0255819 A1 Aug. 11, 2022

(51) Int. Cl.
*H04N 7/15* (2006.01)
*H04L 43/08* (2022.01)
*G06F 3/14* (2006.01)

(52) U.S. Cl.
CPC ............ *H04L 43/08* (2013.01); *G06F 3/1454* (2013.01); *H04N 7/15* (2013.01)

(58) Field of Classification Search
CPC H04L 12/26; H04L 43/00; H04N 7/15; G06F 3/14
USPC .......................................... 348/14.01–14.16
See application file for complete search history.

(56) References Cited

U.S. PATENT DOCUMENTS

| | | | |
|---|---|---|---|
| 5,420,572 A * | 5/1995 | Dolin, Jr. ............ | H04L 12/2803 340/9.16 |
| 7,830,814 B1 | 11/2010 | Allen et al. | |
| 8,237,764 B1 * | 8/2012 | Chen ................... | H04L 12/1827 348/14.01 |
| 9,160,965 B2 | 10/2015 | Redmann et al. | |
| 9,325,940 B2 | 4/2016 | Smelyansky | |
| 9,338,201 B2 | 5/2016 | Krishnan et al. | |
| 9,612,730 B2 | 4/2017 | Huang et al. | |
| 2003/0145076 A1 * | 7/2003 | Procopio ............. | H04L 41/5035 709/224 |
| 2010/0293226 A1 | 11/2010 | Beck et al. | |
| 2011/0249574 A1 * | 10/2011 | Karacali-Akyamac | ...................... H04L 41/145 370/252 |
| 2015/0244760 A1 * | 8/2015 | Tun ..................... | H04L 65/4084 709/223 |
| 2016/0357495 A1 | 12/2016 | Moorjani et al. | |
| 2017/0279860 A1 | 9/2017 | Agarwal et al. | |
| 2020/0036546 A1 | 1/2020 | Soni et al. | |
| 2020/0186575 A1 | 6/2020 | Rofe et al. | |
| 2020/0326846 A1 | 10/2020 | Leong | |
| 2021/0377322 A1 | 12/2021 | Vajravel et al. | |

OTHER PUBLICATIONS

Official Action for U.S. Appl. No. 17/208,563, dated Jan. 24, 2022 16 pages.
Official Action for U.S. Appl. No. 17/208,563, dated May 31, 2022 16 pages.

\* cited by examiner

*Primary Examiner* — Melur Ramakrishnaiah
(74) *Attorney, Agent, or Firm* — Sheridan Ross P.C.

(57) ABSTRACT

Electronic conferences allow participants to join lectures, meetings, and other events remotely via connection of a computing device to a network. The quality received by each node may not be ideal, or even satisfactory. Presenters of the conference content are made aware of the state of the participants by determining, at the end device receiving the conference, a quality of the conference. A monitoring node, such as a communication device utilized by a presenter, may then provide indications of the quality received.

20 Claims, 4 Drawing Sheets

CONFERENCING SESSION MANAGEMENT

COPYRIGHT NOTICE

A portion of the disclosure of this patent document contains material that is subject to copyright protection. The copyright owner has not objected to the facsimile reproduction by anyone of the patent document or the patent disclosure as it appears in the Patent and Trademark Office patent files or records, but otherwise reserves all copyright rights whatsoever.

FIELD OF THE DISCLOSURE

The invention relates generally to systems and methods for electronic communications and particularly to determining received quality of the communication.

BACKGROUND

Electronic conferencing sessions are a popular means to conduct meetings and presentations when all the parties are not physically present. Despite the advantages of such conferences, problems remain. It is quite common for conferences to begin with requests for speakers to unmute, non-speakers to mute, and otherwise attend to setup and connectivity issues. After the session is underway, these problems may intermittently reappear as different speakers contribute to the conference and as connections and other hardware issues arise.

SUMMARY

It is a common occurrence during many conferencing sessions for a host, presenter, or other participant to ask if everyone on the conference can see and/or hear the content being presented. This may be spoken, and provided as an audio portion of an audio channel of the conference, or typed into a separate text channel. Assuming all participants are able to receive the question and respond, this provides the presenter with a snapshot of a current state of the session. However, the situation may change at some point during the conference. For example, participants may lose connectivity, have hardware issues, bandwidth issues, or otherwise stop receiving video and/or audio. Such issues may result in a complete failure, or failure of a particular channel (e.g., the video), to receive the conference. However, the issue may be less than complete, resulting in poor quality and/or intermittent periods of failure.

Participants must first be aware that the conference has degraded or stopped altogether. For example, a conference that is presenting a still image (e.g., photograph, document, etc.) and audio from a presenter may be difficult to determine that audio has stopped. Once a participant is aware of the quality issues, they may attempt to resolve the issue themself and, at some point, notify the presenter, host, technical support, or other party that they are not receiving the conference, a portion of the conference, or that the quality is insufficient. Many participants are reluctant to do so, especially if the issues are intermittent. Accordingly, presenters are often unaware that what is being provided to the participants is not being received, or not being received with sufficient quality, by all participants.

These and other needs are addressed by the various embodiments and configurations of the present invention. The present invention can provide a number of advantages depending on the particular configuration. These and other advantages will be apparent from the disclosure of the invention(s) contained herein.

The embodiments herein are generally directed to solving the foregoing issues and providing other benefits such, in one embodiment, providing feedback to the presenter regarding the health/status of a presentation, including audio and video components for each participant.

In one embodiment, a moderator or presenter is provided with a view reflecting the status of all participants with respect to a presentation during an electronic conferencing session conducted with participants receiving the conference via a network. Additionally or alternatively, the statuses may be provided to other systems and parties, such as technical support components and/or communication devices of technical support staff.

In another embodiment, a view is provided to a device for presentation to a relevant party, such as moderator or a presenter of the session. Additionally or alternatively, the view may provide description of the issue (e.g., portion of the conference lost, etc.) and/or mirror the content as received by the participant on the device of the moderator or presenter. The presentation of the status for the participants may be organized to show and/or indicate which participants are having which issues and/or the severity of such issues. Optionally, participants not having issues may be provided as well.

When the conference is proceeding as expected, the presenter can focus on the presentation and know that the conference is being received as expected by all participants. When participants are not receiving the conference as desired, the presenter may be notified of the issue and/or the participants having the issue and address the issue accordingly. For example, if a particular topic is known by the presenter to be relevant to a participant having issues, the presenter may pause, repeat information, move on to a different topic and return to the current topic later, or otherwise ensure the party receives the required information. If, however, the party having issues is not particularly relevant to the current content of the presentation, the presenter may elect to proceed normally. However, the need to interrupt the presentation to poll participants regarding their reception quality or issues, is avoided as the presenter will have real time, or near real time, information readily available and/or receive notification thereof, such a pop-up messages to the presenter and/or technical support staff.

In one embodiment, quality is determined by capturing a far-end device to determine any delay and/or quality impairment. The capturing may be performed in response to a quality trigger (e.g., another endpoint is having quality issues, quality issues on a different channel (e.g., audio), etc.) and/or periodically at regular intervals (e.g., once every five seconds, fifteen seconds, minute, two minutes, etc.).

In another embodiment, quality may be determined by determined by media packets sent versus received and/or acknowledged (e.g., "ACK"), such as when using Frame Relay. For example, after a frame the acknowledgement can be used for tracking the frame. If the acknowledgment does not arrive after a certain period of time or there are too many packets lost, delayed, or retransmitted, the ratio of acknowledgement to frame sent and/or the timing of the frame versus receipt of the acknowledgement may be utilized to determine endpoints that either aren't responsive, and likely not receiving, or are acknowledging too few or late after a frame is sent to present content with sufficient quality—akin to a heartbeat check. Quality issues detected may be due to latency/delay, packet loss, jitter, or a combination thereof.

In one embodiment, a presenter may be provided with a screen with indica of one or more (or all) participants and the quality issues current observed. Quality may be an overall quality or segmented by media or channel (e.g., video, audio, etc.). Additionally or alternatively, the results may be provided to automated resources, such as to trigger automatic troubleshooting of a connection issue and/or reallocation of bandwidth to attenuate the quality issue, communication devices of technical support staff, and/or to one or more participants of the conference. Quality indicia may be presented as a text message, icon, graphic, application of color, such as to a name of a participant, disconnects, or other indicia of a quality issue. Additionally or alternatively, the quality indicia may be a particular quantification, such as packets lost, resent, and/or delayed, a percentage or number of frames sent versus received/acknowledged, etc.

The result of the determination for any one or more participants may be shared with other participants as well.

In one embodiment, a system is disclosed, comprising: a network interface to a network; a processor configured with instructions maintained in a non-transitory memory that, when read by the processor, cause the processor to: monitor, for each of a plurality of nodes, an electronic conference as received by each node from the network; determine, for each node, a quality of the electronic conference as received by each node; and cause a monitoring node, monitoring the electronic conference, to display for each node an indicia of the quality.

In another embodiment, a method is disclosed, comprising: monitoring, for each of a plurality of nodes, an electronic conference as received by each node from a network; determining, for each node, a quality of the electronic conference as received by each node; and displaying, for each node, an indicia of the quality on a monitoring node monitoring the electronic conference In another embodiment, a system is disclosed, comprising: means to monitor, for each of a plurality of nodes, an electronic conference as received by each node from a network; means to determine, for each node, a quality of the electronic conference as received by each node; and means to display, for each node, an indicia of the quality on a monitoring node.

A system on a chip (SoC) including any one or more of the above embodiments or aspects of the embodiments described herein.

One or more means for performing any one or more of the above embodiments or aspects of the embodiments described herein.

Any aspect in combination with any one or more other aspects.

Any one or more of the features disclosed herein.

Any one or more of the features as substantially disclosed herein.

Any one or more of the features as substantially disclosed herein in combination with any one or more other features as substantially disclosed herein.

Any one of the aspects/features/embodiments in combination with any one or more other aspects/features/embodiments.

Use of any one or more of the aspects or features as disclosed herein.

Any of the above embodiments or aspects, wherein the data storage comprises a non-transitory storage device comprise at least one of: an on-chip memory within the processor, a register of the processor, an on-board memory co-located on a processing board with the processor, a memory accessible to the processor via a bus, a magnetic media, an optical media, a solid-state media, an input-output buffer, a memory of an input-output component in communication with the processor, a network communication buffer, and a networked component in communication with the processor via a network interface.

It is to be appreciated that any feature described herein can be claimed in combination with any other feature(s) as described herein, regardless of whether the features come from the same described embodiment.

The phrase "quality issue" and variations thereof, as used herein, refers to a difference in the content of an electronic conference, as provided to a network for routing to one or more participant nodes, from what is received by each of the one or more participant nodes. Quality issues may be the result of insufficient bandwidth, missing data packets, packets delayed and/or received out of order and/or other defects that may cause the electronic conference, as presented on a participant's node, to omit at least some information that would otherwise be presented on participant's node that is absent the quality issue.

The phrases "at least one," "one or more," "or," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B, and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of this document, a computer-readable storage medium may be any tangible, non-transitory medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably, and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below. Also, while the disclosure is presented in terms of exemplary embodiments, it should be appreciated that an individual aspect of the disclosure can be separately claimed.

BRIEF DESCRIPTION OF THE DRAWINGS

The present disclosure is described in conjunction with the appended figures.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising a numeric reference number, without an alphabetic sub-reference identifier when a sub-reference identifier exists in the figures, when used in the plural, is a reference to any two or more elements with a like reference number. When such a reference is made in the singular form, but without identification of the sub-reference identifier, is a reference one of the like numbered elements, but without limitation as to the particular one of the elements. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices, which may be omitted from or shown in a simplified form in the figures or otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
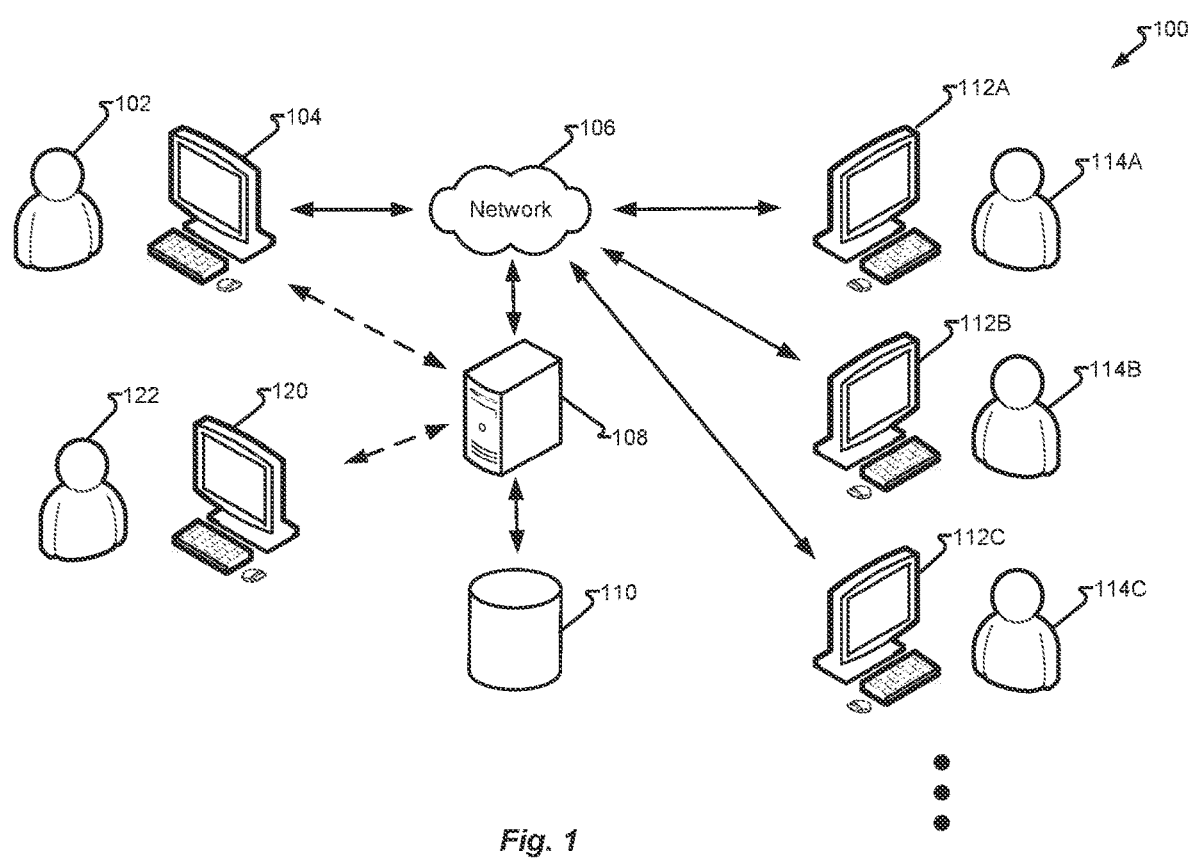
FIG. 1 depicts a first system in accordance with embodiments of the present disclosure.

FIG. 1 depicts system 100 in accordance with embodiments of the present disclosure. In one embodiment, server 108 is presenting an electronic conference to participant 114A-C via their respective participant node 112A-C. The electronic conference is variously embodied and may comprise audio, video, document images, co-browsing, or a combination thereof. Additionally or alternatively, the electronic conference may comprise, in whole or in part, recorded content, such as maintained on data storage 110 or other storage device(s). Additionally or alternatively, electronic conference content may be provided by one or more participant 114, such content from participant 114, and their respective participant node 112, is received by server 108 and provided as conference content to participants 114 and presenter 102. As a further option, the role of presenter and participant may switch between one or more of presenter 102 and participant(s) 114.

In another embodiment, the content of the electronic conference is provided, at least in part, by presenter 102 utilizing presenter node 104, which may further comprise a microphone, camera, document camera, and/or other media capturing device (not shown). Accordingly, presenter 102 may speak and/or be seen by participant 114A-C as they view and listen to the electronic conference on their respective participant node 112A-C, each receiving the electronic conference via network 106 and a conferencing server, which may be or comprise, server 108. Optionally, presenter node 104 may also receive and present the electronic conference. When the content of the electronic conference is provided by one of participant 114, such as to ask a question, their respective participant node 112 may comprise a camera and/or microphone (not shown) to provide video and/or audio content of the participant 114 as a portion of the electronic conference.

While only three participants 114, utilizing their respective participant nodes 112, are illustrated, it should be appreciated that, in other embodiments, any number greater than one participant 114 and one corresponding participant node 112 may be utilized to receive the electronic conference. While presenter node 104, server 108, and data storage 110 are illustrated as discrete components, it should also be appreciated that, in other embodiments, any two or more components may be combined. For example, presenter node 104 may comprise functionality to serve the electronic conference and/or store information and/or content provided to the conference in data storage 110 which may be a component of or attachment to presenter node 104. In a further embodiment, components illustrated may be distributed across a plurality of components, such as when server 108 is segmented into multiple components, which may share the same functionality or comprise different functionality, such as one component manages connectivity, another encoding/decoding content for transport on network 106, another managing quality signals, another managing conferencing services (e.g., muting, drop/add, etc.), and/or other functionality of server 108. Similarly, data storage 110 may comprise a single storage device or a plurality of storage devices.

As the electronic conference is provided by server 108 to network 106 for each participant node 112, quality issues may arise. Such issues may be long-term (e.g., for all or nearly all of the duration of the electronic conference) or intermittent. Knowing that one or more, or a specific, participant 114 is having quality issues may impact the presentation, including the content of the electronic conference provided by presenter 102. Conversely, the fact that one or more participants 114 are having quality issues, depending on the topic and/or the type of quality issues, may be irrelevant to presenter 102 and the electronic conference may progress normally. For example, if a particular agenda item is being discussed relevant to participant 114A, then a quality issue observed on participant node 112A, may be of critical importance. In contrast, it may be of little or no consequence to participant 114B and therefore not relevant that participant node 112B is experiencing quality issues. Similarly, if the content provided is delivered through one media, even though other media are present, the quality issue may or may not be relevant. For example, if presenter 102 is speaking and participant node 112A is having quality issues related to video, it may be of little consequence if the audio portion is of sufficient quality. Similarly, if the content of electronic conference is discussing a photograph or other content with a high degree of visual detail, then audio quality issues may be of limited or no consequence, whereas video quality may be of paramount importance.

In another embodiment, the quality of the electronic conference, may be reported to other interested parties and systems. For example, monitoring node 120 may comprise networking and/or processing components to automatically attempt to resolve certain quality issues associated with a particular participant node 112. Such as utilizing a different encoding schema to encode the electronic conference in a manner that utilizes less bandwidth for any participant node 112 having quality issues related to bandwidth. Additionally or alternatively, monitoring node 120 may alert monitor 122, such as to trigger other remedies. However, resolving quality issues may not occur in a timely manner. For example, presenter 102 may say or show something of critical importance that may only last for a few seconds. If during that time, one or more participant nodes 112 encountered an intermittent quality issue that caused the audio and/or video portion of the electronic conference comprising the critical information to be omitted or incoherent, presenter 102, via embodiments disclosed herein, is made aware of the issue, and may present the information again once they are aware of the resolution or passing of the quality issue observed at the participant node(s) 112.

If the quality issue is not observed again, presenter 102 and/or alert monitor 122 may be indifferent and take no further action once the information is repeated or otherwise successfully conveyed to each participant node 112, or at least each relevant participant node 112. However, if the quality issues are more persistent, measures, such as automatically using a different codec, identifying alternate connectivity, switching from a wireless network to a wired network, or other means may be employed to resolve the issue. If the issue cannot be resolved, presenter 102 is at least aware that the presentation was not received by every participant 114 and may utilize alternative means to communicate the electronic conference's content.

Figure 2:
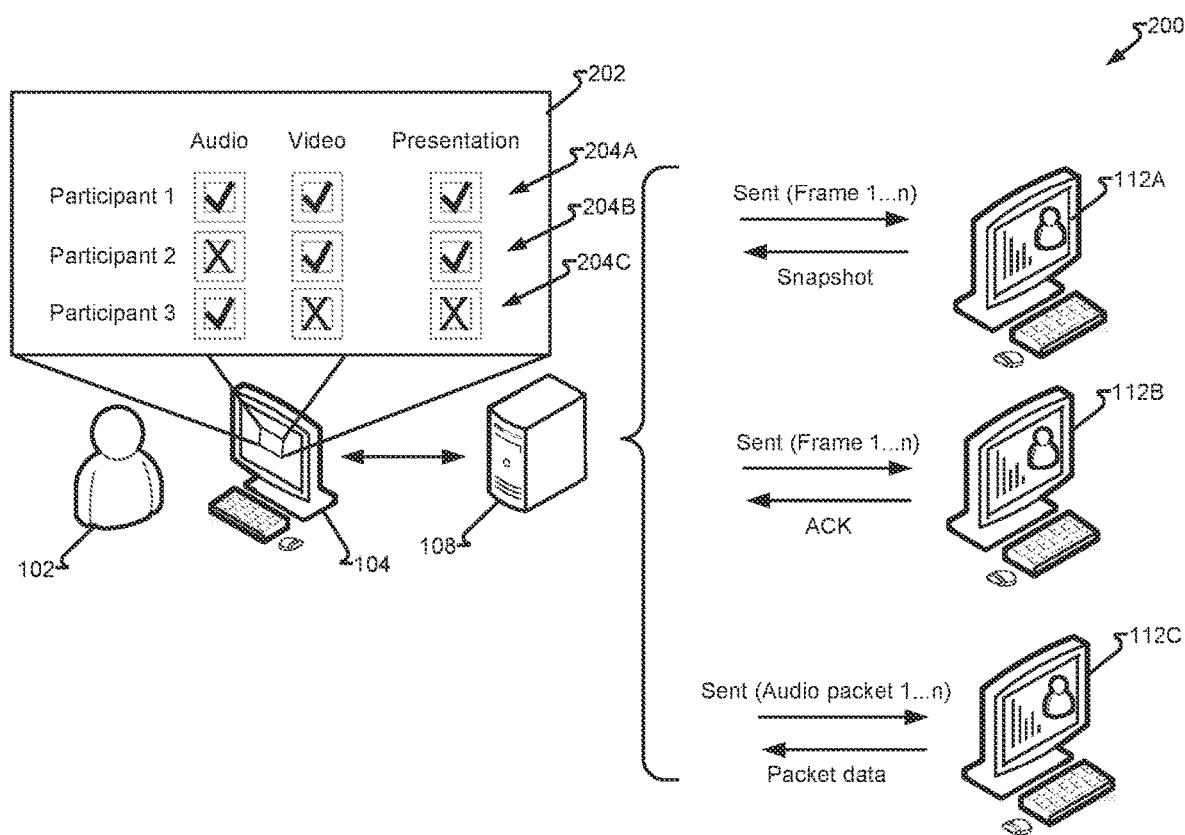
FIG. 2 depicts a second system in accordance with embodiments of the present disclosure.

FIG. 2 depicts system 200 in accordance with embodiments of the present disclosure. System 200 illustrates a portion of the components of system 100 and omits certain other portions described elsewhere. In one embodiment, an electronic conference is underway and server 108 is providing the electronic conference to participant node 112A-C. presenter node 104 and/or server 108 may encode the electronic conference for transport on network 106 (see FIG. 1) in order to provide the electronic conference to each participant node 112. The encoding, and decoding by each participant node 112, may comprise packets, frames, and/or other protocol(s).

In one embodiment, server 108 provides the electronic conference to participant node 112A in the forms of a series of video frames. Participant node 112A may be configured, such as via execution of a conferencing application, to periodically and/or upon receiving a signal from server 108 and/or presenter node 104, capture a snapshot image of the electronic conference as presented on participant node 112A. The snapshot is then sent to server 108 and/or other monitoring equipment. Conveying the snapshot to server 108 is preferably performed with a loss-less encoding and protocol or other means to ensure any loss of data within the snapshot is an accurate depiction of the electronic conference as presented on participant node 112 and not introduced by the capturing, encoding, and transmitting of the snapshot back to server 108.

Server 108 maintains the electronic conference and compares the snapshot received to one or more video frames of the electronic conference and a match determined. For example, a particular video frame sent to participant node 112 is then captured as the snapshot. Server 108 may utilize the timestamp of the video frame as sent versus the timestamp of the snapshot and determine a quality issue based on the time difference therebetween. While some delay is inherent in all communications over a network and a certain amount of time is required to decode the content for presentation on participant node 112, if the time required is excessive (e.g., five seconds, ten seconds, etc.) then a quality issue may be determined to be present. Additionally or alternatively, server 108 may make a region-by-region or pixel-by-pixel comparison between the video frame, as sent, and the snapshot to determine the data lost from the as-sent video frame versus what is presented. If the image has a loss greater than a previously determined threshold, then a quality issue may be determined to be present. As a further option, if the video image captured in the snapshot comprises text, an analysis may be performed by server 108 (e.g., optical character recognition) to determine if the text is readable and, if not, a quality issue is present.

In another embodiment, server 108 provides the electronic conference to participant node 112B utilizing Frame Relay. In response to each packet received, participant node 112 provides an ACK message back to server 108. They timing and/or omission of any ACK messages beyond a previously determined threshold for a given period of time indicates a quality issue. In still another embodiment, server 108 provides the electronic conference to participant node 112, such as packets of audio data. Participant node 112C then replies back to server 108 with information on the packet data (e.g., number received, time when received, out-of-order, dropped, etc.) and, if above a previously determined threshold for a period of time, indicates a quality issue.

Server 108 may further present a status of each participant node 112 to presenter 102 via application window 202 comprising status indicia 204A-C for each of participant node 112A-C, respectively. For example, the electronic conference may comprise an audio portion, which may be sent on a separate audio channel or combined with video, a video portion, and/or a presentation portion (e.g., agenda listing, document images, etc.). If a quality issue is present indicia of the quality issue is provided, such as "x" to indicate the quality issue and/or a checkmark to indicate sufficient quality is being received at the associated participant node 112.

Electronic conferences may comprise a large number of participants, up to many thousands. Displaying, even with paging or scrolling options, each participant node 112 and their status may not be practical or timely. For example, one participant node 112 may have a video failure and their associated indicia updated to indicate the quality issue being present. However, unless there are few participants or application window 202 is displaying that particular participant's information, presenter 102 may not be aware of the quality issue present for that participant. Accordingly, and in another embodiment, the ordering of indicia of participants status indicia 204 may be automatically arranged, such as to present indicia of participants experiencing quality issues at the top of a list or on a first page of a plurality of pages listing each participant. Ordering may be performed automatically and/or upon receiving an input on presenter node 104 to update the list wherein the participant node(s) 112 having quality issues are listed most prominently. The ordering of the quality issues may be performed for audio only, video only, or an overall quality issue. While automatically ordering a listing of the participants in application window 202 in quality issue order, may be particularly beneficial for large number of participants, benefits may be realized with any number of participants greater than two.

Figure 3:
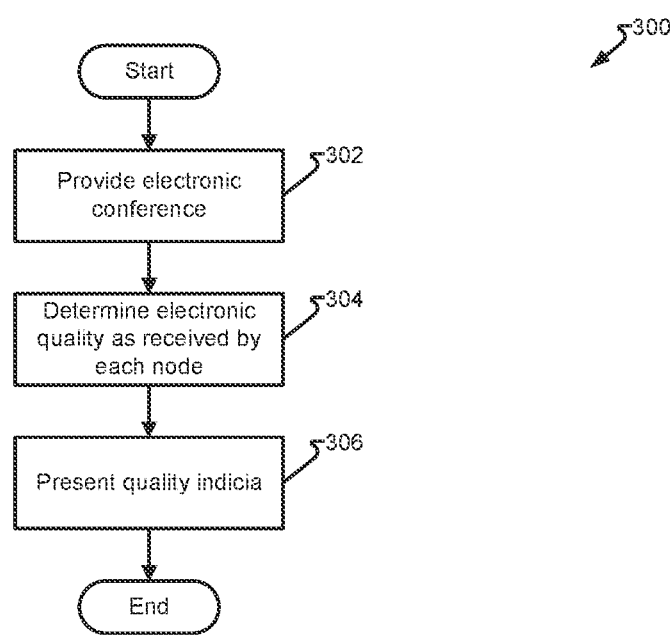
FIG. 3 depicts a process in accordance with embodiments of the present disclosure.

FIG. 3 depicts process 300 in accordance with embodiments of the present disclosure. Process 300 may be embodied as machine-readable instructions that, when read by a processor, such as a processor(s) of server 108, cause the processor to perform the steps of process 300. In one embodiment, process 300 begins and provides an electronic conference, in step 302, to a number of participant nodes, such as server 108 providing the electronic conference to participant node 112A-C.

Step 304 determines if a quality issue is present as observed on any one or more of the participant nodes 112. For example, if the as-presented quality of sound, video, and/or other content has a sufficient data loss or delay, a quality issue is determined to be present. Then, in step 306, indicia of the quality issue being presented to one or more nodes, such as presenter node 104 and/or monitoring node 120. As further option, quality issues may be presented to one or more participant nodes 112. The indica of the quality issue may comprise one or more of an indica (e.g., "x") associated with an identifier of the participant and/or ordering of the indica to be presented in quality-issue order.

Figure 4:
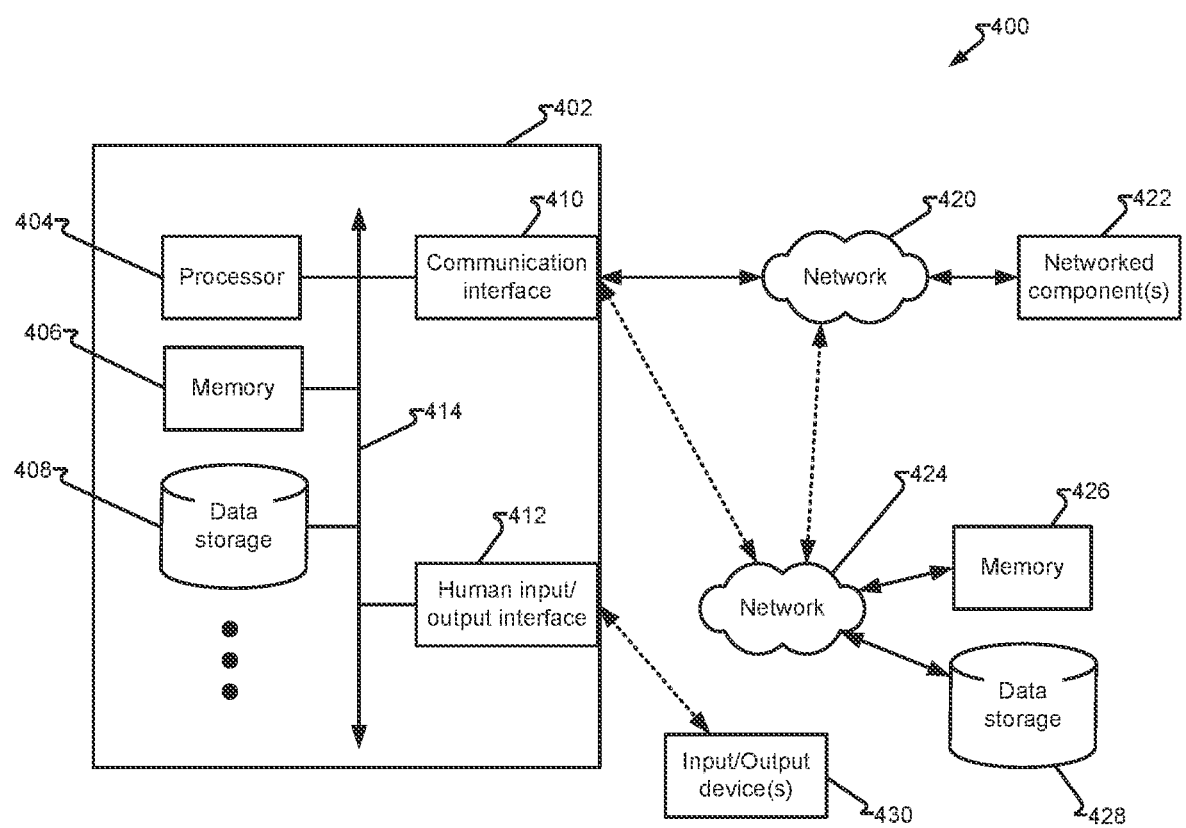
FIG. 4 depicts a third system in accordance with embodiments of the present disclosure.

FIG. 4 depicts a third system in accordance with embodiments of the present disclosure.

FIG. 4 depicts device 402 in system 400 in accordance with embodiments of the present disclosure. In one embodiment, presenter node 104 and/or server 108 may be embodied, in whole or in part, as device 402 comprising various components and connections to other components and/or systems. The components are variously embodied and may comprise processor 404. The term "processor," as used herein, refers exclusively to electronic hardware components comprising electrical circuitry with connections (e.g., pin-outs) to convey encoded electrical signals to and from the electrical circuitry. Processor 404 may be further embodied as a single electronic microprocessor or multiprocessor device (e.g., multicore) having electrical circuitry therein which may further comprise a control unit(s), input/output unit(s), arithmetic logic unit(s), register(s), primary memory, and/or other components that access information (e.g., data, instructions, etc.), such as received via bus 414, executes instructions, and outputs data, again such as via bus 414. In other embodiments, processor 404 may comprise a shared processing device that may be utilized by other processes and/or process owners, such as in a processing array within a system (e.g., blade, multi-processor board, etc.) or distributed processing system (e.g., "cloud", farm, etc.). It should be appreciated that processor 404 is a non-transitory computing device (e.g., electronic machine comprising circuitry and connections to communicate with other components and devices). Processor 404 may operate a virtual processor, such as to process machine instructions not native to the processor (e.g., translate the VAX operating system and VAX machine instruction code set into Intel® 9xx chipset code to allow VAX-specific applications to execute on a virtual VAX processor), however, as those of ordinary skill understand, such virtual processors are applications executed by hardware, more specifically, the underlying electrical circuitry and other hardware of the processor (e.g., processor 404). Processor 404 may be executed by virtual processors, such as when applications (i.e., Pod) are orchestrated by Kubernetes. Virtual processors allow an application to be presented with what appears to be a static and/or dedicated processor executing the instructions of the application, while underlying non-virtual processor(s) are executing the instructions and may be dynamic and/or split among a number of processors.

In addition to the components of processor 404, device 402 may utilize memory 406 and/or data storage 408 for the storage of accessible data, such as instructions, values, etc. Communication interface 410 facilitates communication with components, such as processor 404 via bus 414 with components not accessible via bus 414. Communication interface 410 may be embodied as a network port, card, cable, or other configured hardware device. Additionally or alternatively, human input/output interface 412 connects to one or more interface components to receive and/or present information (e.g., instructions, data, values, etc.) to and/or from a human and/or electronic device. Examples of input/output devices 430 that may be connected to input/output interface include, but are not limited to, keyboard, mouse, trackball, printers, displays, sensor, switch, relay, speaker, microphone, still and/or video camera, etc. In another embodiment, communication interface 410 may comprise, or be comprised by, human input/output interface 412. Communication interface 410 may be configured to communicate directly with a networked component or utilize one or more networks, such as network 420 and/or network 424.

Network 106 may be embodied, in whole or in part, as network 420. Network 420 may be a wired network (e.g., Ethernet), wireless (e.g., WiFi, Bluetooth, cellular, etc.) network, or combination thereof and enable device 402 to communicate with network component(s) 422. In other embodiments, network 420 may be embodied, in whole or in part, as a telephony network (e.g., public switched telephone network (PSTN), private branch exchange (PBX), cellular telephony network, etc.)

Additionally or alternatively, one or more other networks may be utilized. For example, network 424 may represent a second network, which may facilitate communication with components utilized by device 402. For example, network 424 may be an internal network to a business entity or other organization, whereby components are trusted (or at least more so) that networked components 422, which may be connected to network 420 comprising a public network (e.g., Internet) that may not be as trusted.

Components attached to network 424 may include memory 426, data storage 428, input/output device(s) 430, and/or other components that may be accessible to processor 404. For example, memory 426 and/or data storage 428 may supplement or supplant memory 406 and/or data storage 408 entirely or for a particular task or purpose. For example, memory 426 and/or data storage 428 may be an external data repository (e.g., server farm, array, "cloud," etc.) and allow device 402, and/or other devices, to access data thereon. Similarly, input/output device(s) 430 may be accessed by processor 404 via human input/output interface 412 and/or via communication interface 410 either directly, via network 424, via network 420 alone (not shown), or via networks 424 and 420. Each of memory 406, data storage 408, memory 426, data storage 428 comprise a non-transitory data storage comprising a data storage device.

It should be appreciated that computer readable data may be sent, received, stored, processed, and presented by a variety of components. It should also be appreciated that components illustrated may control other components, whether illustrated herein or otherwise. For example, one input/output device 430 may be a router, switch, port, or other communication component such that a particular output of processor 404 enables (or disables) input/output device 430, which may be associated with network 420 and/or network 424, to allow (or disallow) communications between two or more nodes on network 420 and/or network 424. One of ordinary skill in the art will appreciate that other communication equipment may be utilized, in addition or as an alternative, to those described herein without departing from the scope of the embodiments.

In the foregoing description, for the purposes of illustration, methods were described in a particular order. It should be appreciated that in alternate embodiments, the methods may be performed in a different order than that described without departing from the scope of the embodiments. It should also be appreciated that the methods described above may be performed as algorithms executed by hardware components (e.g., circuitry) purpose-built to carry out one or more algorithms or portions thereof described herein. In another embodiment, the hardware component may comprise a general-purpose microprocessor (e.g., CPU, GPU) that is first converted to a special-purpose microprocessor. The special-purpose microprocessor then having had loaded therein encoded signals causing the, now special-purpose, microprocessor to maintain machine-readable instructions to enable the microprocessor to read and execute the machine-readable set of instructions derived from the algorithms and/or other instructions described herein. The machine-readable instructions utilized to execute the algorithm(s), or portions thereof, are not unlimited but utilize a finite set of instructions known to the microprocessor. The machine-readable instructions may be encoded in the microprocessor as signals or values in signal-producing components and included, in one or more embodiments, voltages in memory circuits, configuration of switching circuits, and/or by selective use of particular logic gate circuits. Additionally or alternative, the machine-readable instructions may be accessible to the microprocessor and encoded in a media or device as magnetic fields, voltage values, charge values, reflective/non-reflective portions, and/or physical indicia.

In another embodiment, the microprocessor further comprises one or more of a single microprocessor, a multi-core processor, a plurality of microprocessors, a distributed processing system (e.g., array(s), blade(s), server farm(s), "cloud", multi-purpose processor array(s), cluster(s), etc.) and/or may be co-located with a microprocessor performing other processing operations. Any one or more microprocessor may be integrated into a single processing appliance (e.g., computer, server, blade, etc.) or located entirely or in part in a discrete component connected via a communications link (e.g., bus, network, backplane, etc. or a plurality thereof).

Examples of general-purpose microprocessors may comprise, a central processing unit (CPU) with data values encoded in an instruction register (or other circuitry maintaining instructions) or data values comprising memory locations, which in turn comprise values utilized as instructions. The memory locations may further comprise a memory location that is external to the CPU. Such CPU-external components may be embodied as one or more of a field-programmable gate array (FPGA), read-only memory (ROM), programmable read-only memory (PROM), erasable programmable read-only memory (EPROM), random access memory (RAM), bus-accessible storage, network-accessible storage, etc.

These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

In another embodiment, a microprocessor may be a system or collection of processing hardware components, such as a microprocessor on a client device and a microprocessor on a server, a collection of devices with their respective microprocessor, or a shared or remote processing service (e.g., "cloud" based microprocessor). A system of microprocessors may comprise task-specific allocation of processing tasks and/or shared or distributed processing tasks. In yet another embodiment, a microprocessor may execute software to provide the services to emulate a different microprocessor or microprocessors. As a result, first microprocessor, comprised of a first set of hardware components, may virtually provide the services of a second microprocessor whereby the hardware associated with the first microprocessor may operate using an instruction set associated with the second microprocessor.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm."

Examples of the microprocessors as described herein may include, but are not limited to, at least one of Qualcomm® Snapdragon® 800 and 801, Qualcomm® Snapdragon® 610 and 615 with 4G LTE Integration and 64-bit computing, Apple® A7 microprocessor with 64-bit architecture, Apple® M7 motion comicroprocessors, Samsung® Exynos® series, the Intel® Core™ family of microprocessors, the Intel® Xeon® family of microprocessors, the Intel® Atom™ family of microprocessors, the Intel Itanium® family of microprocessors, Intel® Core® i5-4670K and i7-4770K 22 nm Haswell, Intel® Core® i5-3570K 22 nm Ivy Bridge, the AMD® FX™ family of microprocessors, AMD® FX-4300, FX-6300, and FX-8350 32 nm Vishera, AMD® Kaveri microprocessors, Texas Instruments® Jacinto C6000™ automotive infotainment microprocessors, Texas Instruments® OMAP™ automotive-grade mobile microprocessors, ARM® Cortex™-M microprocessors, ARM® Cortex-A and ARM926EJ-S™ microprocessors, other industry-equivalent microprocessors, and may perform computational functions using any known or future-developed standard, instruction set, libraries, and/or architecture.

Any of the steps, functions, and operations discussed herein can be performed continuously and automatically.

The exemplary systems and methods of this invention have been described in relation to communications systems and components and methods for monitoring, enhancing, and embellishing communications and messages. However, to avoid unnecessarily obscuring the present invention, the preceding description omits a number of known structures and devices. This omission is not to be construed as a limitation of the scope of the claimed invention. Specific details are set forth to provide an understanding of the present invention. It should, however, be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components or portions thereof (e.g., microprocessors, memory/storage, interfaces, etc.) of the system can be combined into one or more devices, such as a server, servers, computer, computing device, terminal, "cloud" or other distributed processing, or collocated on a particular node of a distributed network, such as an analog and/or digital telecommunications network, a packet-switched network, or a circuit-switched network. In another embodiment, the components may be physical or logically distributed across a plurality of components (e.g., a microprocessor may comprise a first microprocessor on one component and a second microprocessor on another component, each performing a portion of a shared task and/or an allocated task). It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

In yet another embodiment, the systems and methods of this invention can be implemented in conjunction with a special purpose computer, a programmed microprocessor or microcontroller and peripheral integrated circuit element(s), an ASIC or other integrated circuit, a digital signal microprocessor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include microprocessors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein as provided by one or more processing components.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Embodiments herein comprising software are executed, or stored for subsequent execution, by one or more microprocessors and are executed as executable code. The executable code being selected to execute instructions that comprise the particular embodiment. The instructions executed being a constrained set of instructions selected from the discrete set of native instructions understood by the microprocessor and, prior to execution, committed to microprocessor-accessible memory. In another embodiment, human-readable "source code" software, prior to execution by the one or more microprocessors, is first converted to system software to comprise a platform (e.g., computer, microprocessor, database, etc.) specific set of instructions selected from the platform's native instruction set.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A system, comprising:
a network interface to a network; and
a processor configured with instructions maintained in a non-transitory memory that, when read by the processor, cause the processor to:
monitor, for each of a plurality of nodes, an electronic conference as received by each node from the network;
determine, for each node, a quality of the electronic conference as received by each node; and
cause a monitoring node, monitoring the electronic conference, to display for each node an indicia of the quality; and
wherein the processor causes the monitoring node to display, for each node, an indicia of the quality, further comprising automatically moving the indicia associated with each node to a position on the monitoring node closest to a location of the monitoring node designated for low-quality reception wherein each node is a distance from the location based on the determined quality of the electronic conference.

2. The system of claim 1, wherein:
the processor monitors the electronic conference as transmitted to the network;
the processor monitors the electronic conference further comprising, for at least one node, remotely capturing a snapshot of a visual portion of the electronic conference from the at least one node; and
the processor determines the quality, for the at least one node, comprising comparing the snapshot to the electronic conference as transmitted.

3. The system of claim 2, wherein the comparison of the snapshot to the electronic conference comprises a data loss between the electronic conference as transmitted and the snapshot.

4. The system of claim 2, wherein the comparison of the snapshot to the electronic conference comprises determining a delay between a time the snapshot was presented on the at least one node, and a time the electronic conference transmitted a portion of the electronic conference corresponding to the snapshot.

5. The system of claim 1, wherein the processor monitors the electronic conference further comprising, for at least one node, determining a number of acknowledgement messages received, for a given time, by the at least one node, versus a sent number of packets comprising a portion of the electronic conference during the given time.

6. The system of claim 1, wherein the processor monitors the electronic conference further comprising, for at least one node, determining a time an acknowledgement message is received by the processor from the at least one node versus a time the acknowledgement message is expected to be received by the processor.

7. The system of claim 1, wherein the processor orders the indica of the quality in response to a user input on the monitoring node based on a specific criteria, wherein the specific criteria comprises the quality of the electronic conference.

8. The system of claim 1, wherein the processor determines, for each node, the quality of the electronic conference as received by each node, further comprising determining a video quality of a video portion of the electronic conference received by each node.

9. A method, comprising:
monitoring, for each of a plurality of nodes, an electronic conference as received by each node from a network;
determining, for each node, a quality of the electronic conference as received by each node;
displaying, for each node, an indicia of the quality on a monitoring node monitoring the electronic conference; and
automatically moving the indicia associated with each node to a position on the monitoring node closest to a location of the monitoring node designated for low-quality reception wherein each node is a distance from the location based on the determined quality of the electronic conference.

10. The method of claim 9, further comprising:
monitoring the electronic conference as transmitted to the network;
wherein monitoring further comprises, for at least one node, remotely capturing a snapshot of a visual portion of the electronic conference from the at least one node; and
wherein determining the quality, for the at least one node, comprises comparing the snapshot to the electronic conference as transmitted.

11. The method of claim 10, wherein comparing the snapshot to the electronic conference comprises determining a data loss between the electronic conference as transmitted and the snapshot.

12. The method of claim 10, wherein comparing the snapshot to the electronic conference comprises determining a delay between a time the snapshot was presented on the at least one node, and a time the electronic conference transmitted a portion of the electronic conference corresponding to the snapshot.

13. The method of claim 9, further comprising, for at least one node, determining a number of acknowledgement messages received, for a given time, by the at least one node, versus a transmitted number of packets comprising a portion of the electronic conference during the given time.

14. The method of claim 9, further comprising, for at least one node, determining a time an acknowledgement message is received by a processor from the at least one node versus a time the acknowledgement message is expected to be received by the processor.

15. The method of claim 9, wherein moving of the indicia associated with each node occurs in response to receiving a user input on the monitoring node based on a specific criteria, wherein the specific criteria comprises the quality of the electronic conference.

16. The method of claim 9, wherein determining, for each node, the quality of the electronic conference as received by each node, further comprising determining a video quality of a video portion of the electronic conference received by each node.

17. A system, comprising:
means to monitor, for each of a plurality of nodes, an electronic conference as received by each node from a network;
means to determine, for each node, a quality of the electronic conference as received by each node;
means to display, for each node, an indicia of the quality on a monitoring node; and
means to automatically move the indicia associated with each node to a position on the monitoring node closest to a location of the monitoring node designated for low-quality reception wherein each node is a distance from the location based on the determined quality of the electronic conference.

18. The system of claim 17, further comprising:
means to monitor the electronic conference as transmitted to the network;
wherein the means to monitor the electronic conference further comprises, for at least one node, means to remotely capture a snapshot of a visual portion of the electronic conference from the at least one node; and
the means to determine the quality, for the at least one node, further comprises means to compare the snapshot to the electronic conference as transmitted.

19. The system of claim 17, wherein the means to monitor the electronic conference further comprises, for at least one node, means to determine a number of acknowledgement messages received, for a given time, by the at least one node, versus a sent number of packets comprising a portion of the electronic conference during the given time.

20. The system of claim 17, further comprising, for at least one node, means to determine a time an acknowledgement message is received from the at least one node versus a time the acknowledgement message is expected to be received.

* * * * *